Patented Oct. 17, 1950

2,525,792

UNITED STATES PATENT OFFICE 2,525,792

ACYLATED PROTEIN AND METHOD FOR MAKING SAME

William G. Gordon and Richard W. Jackson, Philadelphia, Pa., and Alfred E. Brown, Washington, D. C., assignors to the United States of America as represented by the Secretary of Agriculture No Drawing. Application July 8, 1947, Serial No. 759,682

9 Claims. (Cl. 260—119)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to acylated protein derivatives, particularly derivatives of casein and other similar materials, and has among its objects the production of plastic materials for molding purposes which, when molded, give articles of superior characteristics, especially relative to their low water absorption. Other objects will become apparent from the description of the invention.

Organic bases, such as pyridine, are ordinarily employed as reaction media for the modification of proteins by acid chlorides for the purpose of avoiding the undesirable side reaction which occurs in aqueous media, namely, hydrolysis of the acid chloride. However, proteins so modified in these organic bases, are usually highly colored.

We have found that in aqueous media, the excess of higher fatty acid chloride reacting with water can be diminished if the hydroxyl ion concentration of the reaction mixture is carefully maintained at a high level. Modification of the protein can thus be accomplished in aqueous media without significant change in the color of the original protein.

The invention also avoids the use of costly materials like pyridine, and the economy of the method is further illustrated by the excellent yields of the product, since there is no appreciable loss of the original protein.

According to our invention, a protein material, such as casein, preferably of the lactic, sulfuric, and hydrochloric acid type, and other similar protein materials, is dissolved in aqueous alkali, preferably at a pH of about from 7 to 13, and the resulting solution is reacted with an acid chloride of an aliphatic, higher fatty acid, preferably of an acid having from 8 to 18 carbon atoms, such as lauric, myristic, palmitic, oleic, stearic, or mixtures thereof, while maintaining the alkalinity of the reaction mixture.

The products resulting contain about from 10% to 30% acyl groups introduced and are different and much superior to those obtained using organic bases as the reaction media.

The acid chlorides used in the reaction can be prepared from commercial fatty acids in the usual manner, and can be added as such, or in solution, such as in dry ether, with sufficient alkali to maintain the desired alkalinity of the reaction mixture.

The conditions of protein concentration, acid chloride concentration, temperature, and time of reaction may be varied within wide limits. It is preferred, however, that the amount of acid chloride used be about from 0.2 mol to 0.7 mol per 100 grams of protein material, and the temperature at which the reaction is conducted be within the range of about from 0° C. to 25° C. The time of reaction can be as short as one hour or extended beyond such time, if desired, after which the formed acylated derivative is precipitated by means of acid, isolated, as by filtration or centrifugation, washed, dried, and the by-product (uncombined fatty acid) removed by extraction.

After removal of the uncombined fatty acid by extraction, the residual acylated protein derivative, which is insoluble in the common organic solvents, such as methyl alcohol, ethyl alcohol, ether, and petroleum ether, is obtained as a white powder. This powder is also insoluble in water and in dilute acids. It is soluble, however, in a number of chlorohydrins, such as ethylene chlorohydrin, and in chloroallyl alcohols. It forms a turbid suspension in cold dilute alkali which is transformed into a clear, colorless solution on warming.

It is believed that the chemistry involved in the production of these protein derivatives is the rapid acylation of the protein by the acid chloride at the free amino groups and at other reaction points under the conditions employed.

The derivatives prepared according to the invention, may be molded as such without further treatment and will form useful molded articles.

These derivatives, furthermore, may be used to prepare molding powders, either by the addition of a small amount of water to bring the water content of the powder to about from 5% to 10%, or by the addition of any suitable plasticizer to the derivative as such, or by treatment of the derivative with aqueous formaldehyde to harden it, prior to the addition of small amounts of water or other suitable plasticizers.

The molding powders thus obtained are readily molded, formed, pressed, and rolled into desired forms with the aid of pressure and heat to produce many and varied useful and practical molded articles which have a clear, nearly transparent appearance, low water absorption, good strength and toughness, and are thermoplastic in nature.

Such products can be colored to any desired shade with suitable synthetic colors and pigments in the usual manner.

Commercial protein plastics have a water absorption of from 7% to 14% under the water-absorption test method of A. S. T. M. D-570-42. This water-absorption test consists of the preparation of test discs 2 inches in diameter by ⅛ inch thick, heating these discs in an oven at 50° C. for 24 hours to condition to substantial dryness, weighing them, then immersing them in distilled water for 24 hours at 25° C., and then reweighing them, the conditioned weight being taken as the dry weight.

The derivatives, which contain about from 10% to 30% acyl groups introduced, can be improved by treatment with formaldehyde to harden them, the concentration of the formaldehyde being capable of being varied within wide limits. Such hardening may be carried out at room temperature at a pH of about from 3.5 to 6.0 for about 24 hours or more, or, if desired, at about 60° C. for as little as two hours. This formaldehyde treatment further reduces the water absorption of the final molded article.

In contrast to the water absorption of from 7% to 14% for ordinary formaldehyde-hardened casein plastic molded articles, the articles molded from most of the formaldehyde-hardened derivatives obtained by our process showed only about from 2% to 6% water absorption under the aforementioned water absorption test. Furthermore, because the flow properties of our derivatives are good, the molding can be accomplished with only about from 5% to 10% water content in the derivatives. The final molded articles will not warp or shrink.

If the formaldehyde treatment is omitted, a useful molded article is obtained but it has a slightly higher water absorption.

The following examples are illustrative of the invention:

Example I

Twenty grams of hydrochloric-acid-precipitated casein is dissolved in alkali to give a 10% solution of casein, the pH being adjusted to 12. Twenty-two cubic centimeters of palmitoyl chloride, prepared by the action of $PCl_3$ on palmitic acid, is dissolved in 100 cc. of dry ether, and this solution then is added dropwise to the reaction mixture with vigorous stirring. The acid chloride is added over a one-half hour period, and stirring is continued for 2½ hours, the reaction mixture being kept at pH 12 by the addition of 1 N NaOH. At this point the solution becomes quite thick, and it may be diluted, if desired, after the addition of the acid chloride. The solution is then adjusted to pH 3.9 with dilute hydrochloric acid with a resultant precipitate of the protein derivative. The thus formed protein derivative is isolated by filtration, which is followed by washing and drying. The free palmitic acid accompanying the derivative is removed with ether extraction. The yield of derivative, palmitoyl casein, is 24.5 grams of a white, fluffy powder.

Example II

Twenty-six grams of acid casein is dissolved in dilute NaOH to give a 10% solution of casein, the pH being adjusted to 8.5. Thirty-five cubic centimeters of stearoyl chloride, prepared by the action of $PCl_3$ on stearic acid, is dissolved in 100 cubic centimeters of dry ether, and this solution is added dropwise to the reaction medium with stirring, the pH of 8.5 being maintained by the addition of 2 N NaOH. The total reaction time is about 2 hours. The derivative is then isolated as described in Example I. The yield of the derivative, stearoyl casein, is 29.5 grams of a white, fluffy powder.

Example III

Three hundred grams of casein is dissolved in 2700 cubic centimeters of water and 300 cubic centimeters of 1 N NaOH, the pH of the resulting solution being 9.3. Three hundred and thirty cubic centimeters of oleoyl chloride, prepared by the action of $PCl_3$ on oleic acid, is dissolved in 350 cubic centimeters of dry ether, and this solution is added gradually during the course of 20 minutes to the reaction medium, with stirring, the pH being maintained at 9.0 by the simultaneous addition of 2 N NaOH. The total reaction time is about 2 hours. The derivative is then isolated as described in Example I. The yield of the derivative, oleoyl casein, is 370 grams.

Example IV

The procedure of Example I is followed, except that the reaction mixture is cooled in an ice bath.

Example V

The procedure of Example II is followed, except that the reaction is run at pH 12.5.

Example VI

Ten grams of palmitoyl casein, the derivative prepared in Example I, was treated with 30 cc. of 10% formaldehyde at room temperature for 48 hours. The derivative was then filtered, washed thoroughly with water, and air dried. The yield was 10 grams.

Example VII

Two and one-half grams of stearoyl casein, the derivative prepared in Example II, was heated with 30 cc. of 10% formaldehyde at about from 55° to 65° C., with stirring for about two hours. The derivative was then filtered and washed thoroughly with water.

Example VIII

Two and one-half grams of stearoyl casein, the derivative prepared in Example II, was treated with 30 cc. of 10% formaldehyde at room temperature for 24 hours, then filtered, and washed thoroughly with water.

Example IX

The reaction was carried out as described in Example III, but after acidification and precipitation of the derivative at pH 3.9, filtration and washing, the derivative was not dried. It was suspended in enough water to give a total volume of 5 liters and 1500 cc. of 37% formaldehyde were added. The mixture was allowed to stand at room temperature for 48 hours. The derivative was then filtered, washed well with water, dried, ground and extracted with ether to remove uncombined oleic acid.

Example X

The reaction was carried out as described in Example I, but formaldehyde was added to the reaction mixture after acidification to pH 6.0, the concentration of formaldehyde in the mixture being about between 5% and 10%. The temperature then was raised to about 60° C. and so held for about 2 hours. The reaction mixture was then cooled to room temperature, acidified to pH 4.0, and the product isolated as described in Example I.

Using procedures similar to those described above, casein was also reacted with chlorides of other fatty acids, such as caprylyl, pelargonyl, capryl, lauroyl, and myristoyl chloride, yielding acylated derivatives having properties similar to those described above.

Acylated derivatives having analogous properties were also produced when other proteins, such as egg albumen, zein, soybean protein, peanut protein, and cottonseed protein were used in place of casein.

The acylated protein products, with or without formaldehyde treatment, may be molded under a variety of conditions, either with or without added fillers and plasticizers. For example, any of the derivatives described in Examples VI through X can be adjusted to about an 8% moisture content, although the powder still looks dry, then placed in a disc mold, either cold or preheated, and pieces then molded at temperatures of about from 100° to 120° C. and at pressures of about from 1,000 to 5,000 pounds per square inch. Clear, nearly transparent pieces are obtained having a water absorption of about from 2% to 6%.

Having thus described our invention, what we claim is:

1. A process of preparing a protein derivative which is completely soluble in warm, dilute aqueous alkali, comprising reacting an aqueous alkaline solution of a protein material with the chloride of an aliphatic higher fatty acid containing from 8 to 18 carbon atoms, precipitating the formed acylated protein derivative by acidifying the resulting solution, and recovering the acylated protein derivative.

2. The process of claim 1 wherein the protein material is casein.

3. A process of preparing a palmitoyl casein which is completely soluble in warm, dilute aqueous alkali, comprising reacting an aqueous alkaline solution of casein with palmitoyl chloride, precipitating the formed palmitoyl casein by acidifying the resulting solution, and recovering the palmitoyl casein.

4. A process of preparing a stearoyl casein which is completely soluble in warm, dilute aqueous alkali, comprising reacting an aqueous alkaline solution of casein with stearoyl chloride, precipitating the formed stearoyl casein by acidifying the resulting solution, and recovering the stearoyl casein.

5. A process of preparing an oleoyl casein which is completely soluble in warm, dilute aqueous alkali, comprising reacting an aqueous alkaline solution of casein with oleoyl chloride, precipitating the formed oleoyl casein by acidifying the resulting solution, and recovering the oleoyl casein.

6. A molding powder comprising an acylated protein containing about from 10% to 30% aliphatic acyl groups introduced, each of said acyl groups having from 8 to 18 carbon atoms, said acylated protein being characterized in that it will swell in cold dilute aqueous alkali to form a turbid suspension which on warming is transformed into a clear colorless solution.

7. The molding powder of claim 6 wherein the acylated protein is palmitoyl casein.

8. The molding powder of claim 6 wherein the acylated protein is stearoyl casein.

9. The molding powder of claim 6 wherein the acylated protein is oleoyl casein.

WILLIAM G. GORDON.
RICHARD W. JACKSON.
ALFRED E. BROWN.

REFERENCES CITED

The following references are of record in the file of this patent:

UNITED STATES PATENTS

| Number | Name | Date |
| --- | --- | --- |
| 2,233,891 | Kratz | Mar. 4, 1941 |
| 2,309,380 | Brother et al. | Jan. 26, 1943 |
| 2,408,026 | Atwood | Sept. 24, 1946 |

FOREIGN PATENTS

| Number | Country | Date |
| --- | --- | --- |
| 805,375 | France | Aug. 22, 1936 |
| 831,630 | France | June 13, 1938 |
| 447,715 | Belgium | Nov. 30, 1942 |

OTHER REFERENCES

Brother, Ind. and Eng. Chem., 30:1236–1240 (Nov. 1938).

Brother et al., Ind. and Eng. Chem., 31:84–87 (Jan. 1939).

Brother, Ind. and Eng. Chem., 32:31–33 (Jan. 1940).

Gordon et al., Ind. and Eng. Chem., vol. 38, pp. 90 to 94 (1946).